United States Patent [19]

Schuetz

[11] Patent Number: 5,006,493

[45] Date of Patent: *Apr. 9, 1991

[54] NOVEL CERAMIC BINDER COMPRISING POLY(ETHYLOXAZOLINE)

[75] Inventor: James E. Schuetz, Midland, Mich.

[73] Assignee: The Dow Chemical Company, Midland, Mich.

[*] Notice: The portion of the term of this patent subsequent to May 16, 2006 has been disclaimed.

[21] Appl. No.: 846,407

[22] Filed: Mar. 31, 1986

[51] Int. Cl.$^5$ .................................................. C04B 35/00
[52] U.S. Cl. ..................................... 501/127; 501/87; 501/1; 524/430; 524/612; 264/63; 419/65
[58] Field of Search ................ 524/430, 612; 501/127, 501/1, 87; 264/63; 419/65

[56] References Cited

U.S. PATENT DOCUMENTS

| | | | |
|---|---|---|---|
| 3,042,641 | 7/1962 | West et al. ............................ | 260/29.2 |
| 3,597,253 | 8/1971 | Beschke et al. ................... | 106/288 B |
| 3,656,981 | 4/1972 | Beschke et al. ................... | 106/288 B |
| 3,752,689 | 8/1973 | Moore, Jr. ............................ | 106/38.3 |
| 3,754,945 | 8/1973 | Moore, Jr. .......................... | 106/38.35 |
| 3,767,458 | 10/1973 | Moore, Jr. ............................ | 117/100 S |
| 3,860,476 | 1/1975 | Moore, Jr. ............................ | 156/297 |
| 4,004,933 | 1/1977 | Ravault ............................... | 106/40 R |
| 4,081,576 | 3/1978 | Hensel et al. ....................... | 427/385 C |
| 4,145,316 | 3/1979 | Robson ................................ | 252/465 |
| 4,247,500 | 1/1981 | Dixon et al. ............................ | 264/63 |
| 4,247,671 | 1/1981 | Reitz et al. ......................... | 526/260 O |
| 4,267,065 | 5/1981 | Johnson, Jr. ....................... | 252/62.62 |
| 4,292,199 | 9/1981 | Rohrbach et al. .................. | 252/430 |
| 4,301,020 | 11/1981 | Johnson, Jr. et al. ............ | 252/62.62 |
| 4,436,867 | 3/1984 | Pomplun et al. ................ | 524/612 X |
| 4,442,175 | 4/1984 | Flannery et al. ..................... | 428/404 |
| 4,474,928 | 10/1984 | Hoenig et al. .................. | 525/186 O |
| 4,482,388 | 11/1984 | Crosbie ............................ | 106/287.1 |
| 4,525,495 | 6/1985 | Dorman et al. ................. | 524/791 X |
| 4,532,187 | 7/1985 | Hoenig et al. .................. | 428/461 X |
| 4,830,994 | 5/1989 | Schuetz ............................... | 501/127 |

FOREIGN PATENT DOCUMENTS 0816132 6/1973 Belgium .
3315092 4/1982 Fed. Rep. of Germany .
9116166 12/1982 Japan .

OTHER PUBLICATIONS

Chemical Abstracts, 85:165496j, Kunz, "Use of Polymers in the Ceramic Industry", vol. 85, p. 368 (1976).
Chemical Abstracts, 102:118053x, Bol'shakov et al., "Burn-Preventing Wash for Foundry Sand Molds and Cores", vol. 102, p. 297 (1983).

*Primary Examiner*—Karl Group
*Attorney, Agent, or Firm*—Dan R. Howard; Paul D. Hayhurst

[57] ABSTRACT

A composition comprising a ceramic material and, as a binder, poly(ethyloxazoline).

14 Claims, No Drawings

NOVEL CERAMIC BINDER COMPRISING POLY(ETHYLOXAZOLINE)

BACKGROUND OF THE INVENTION

This invention relates generally to a ceramic composition and to a method for producing said composition.

Conventional ceramic processing typically comprises ball milling a slurry, which contains a ceramic material and a solvent, to reduce the particle size of the ceramic material. The milled slurry is dried, such as by spray drying or pan drying, and the dried ceramic composition is then formed into articles.

In the fabrication of ceramic articles, a binder may be employed. A good binder must satisfy several criteria. It should be soluble in the slurry containing the ceramic and it should have a low solution viscosity thereby permitting high solids content in the slurry and facilitating ball milling. Also, a good binder should be compatible with other additives and processing steps. Since the binder is not a desirable component of a final ceramic article, it should be easily removable at some point in the processing sequence. In addition, the binder should impart green strength to the green fabricated article.

SUMMARY OF THE INVENTION

This invention is a novel ceramic composition comprising a ceramic material and poly(ethyloxazoline).

Another aspect of this invention is a method comprising forming a slurry containing a ceramic material and poly(ethyloxazoline), converting said slurry into a substantially dry powder, and converting the powder into a ceramic body of a desired shape.

In another aspect, this invention is a ceramic body prepared by the method comprising forming a slurry containing a ceramic material and poly(ethyloxazoline), converting said slurry to a substantially dry powder, and converting the powder into a ceramic body of a desired shape.

DETAILED DESCRIPTION OF THE INVENTION

In general, any ceramic which comprises an inorganic, nonmetallic material as its essential component can be employed in this invention. Minor impurities can be present in the ceramic material so long as they do not substantially affect the densification of said material. Preferably, the ceramic material consists essentially of a ceramic and, more preferably, the ceramic material consists of a ceramic. Preferred ceramics include, for example, oxides, carbides, nitrides, silicides, borides, phosphides, sulfides and mixtures thereof. More preferred ceramics include magnesia, mullite, thoria, beryllia, urania, spinels, zirconium oxide, bismuth oxide, aluminum oxide, magnesium oxide, barium titanate, corderite, boron nitride, tungsten carbide, tantalum carbide, titanium carbide, niobium carbide, zirconium carbide, boron carbide, hafnium carbide, silicon carbide, niobium boron carbide, aluminum nitride, titanium nitride, zirconium nitride, tantalum nitride, hafnium nitride, niobium nitride, boron nitride, silicon nitride, titanium boride, chromium boride, zirconium boride, tantalum boride, molybdenum boride, tungsten boride, cerium sulfide, molybdenum sulfide, cadmium sulfide, zinc sulfide, titanium sulfide, magnesium sulfide, zirconium sulfide and mixtures and alloys of these. Even more preferred ceramics include zirconium oxide, aluminum oxide, magnesium oxide, barium titanate, silicon carbide, corderite, spinels and boron nitride. The most preferred ceramic is aluminum oxide.

In a preferred embodiment of this invention, the ceramic material is particulate and has a particle size of about 100 microns or less, more preferably about 10 microns or less, and most preferably about 1 micron or less. In another preferred embodiment, fibrous ceramic material or other reinforcing ceramic material can be mixed with the particulate ceramic material. It is believed that incorporation of fibrous ceramic material or other reinforcing ceramic material may increase the strength and fracture toughness of the ceramic body produced.

The binder, poly(ethyloxazoline), is employed in a binding amount. Preferably, the binder is employed in an amount sufficient to provide a green ceramic article with enough strength to retain its shape during normal handling and processing. Preferably the ceramic composition comprises between about 0.1 and about 20 weight percent poly(ethyloxazoline) and more preferably between about 0.1 and about 10 weight percent based on the weight of the ceramic material. Even more preferably, said composition comprises between about 0.2 and about 5 weight percent of poly(ethyloxazoline), and most preferably from about 0.5 to about 3.0 weight percent. The poly(ethyloxazoline) preferably has an average molecular weight ranging from about 10,000 to about 750,000 and more preferably from about 50,000 to about 500,000.

In a preferred embodiment of this invention, the ceramic composition consists essentially of a ceramic and poly(ethyloxazoline) and more preferably the ceramic composition consists of a ceramic and poly(ethyloxazoline).

An optional component of the composition of this invention is a metallic material selected from the group consisting of cobalt, nickel, iron, tungsten, molybdenum, tantalum, titanium, chromium, niobium, boron, zirconium, vanadium, silicon, palladium, hafnium, aluminum, copper and alloys and mixtures of these.

The method of this invention comprises forming a slurry of the ceramic material and poly(ethyloxazoline). The slurry preferably contains a solvent which substantially solubilizes poly(ethyloxazoline). Preferred solvents include water, methanol, ethanol, acetone, other polar organic solvents and mixtures thereof. Water is the most preferred solvent due to its ease of use and nonflammability. However, polar organic solvents, such as methanol, ethanol and acetone, are particularly useful in this invention due to the chemical reactions that may occur if the ceramic is in the presence of water. For example, nitrides may form oxides in the presence of water, and this may or may not be desired.

In a preferred embodiment of this invention, the slurry, comprising particulate ceramic material and poly(ethyloxazoline), is ball milled by conventional and well-known techniques. The ball milling reduces the particle size of the ceramic and distributes the poly(ethyloxazoline) substantially uniformly over the ceramic particles. Poly(ethyloxazoline) may facilitate said milling due to its low solution viscosity, thereby permitting a high solid to liquid ratio. In addition, a dispersant, such as DARVAN®, an ammonium polyelectrolyte commercially available from R. T. Vanderbilt Company, Inc., can be added to the above slurry to facilitate milling and aid in maintaining a high solid to liquid ratio.

The slurry preferably contains a solids content of between about 20 and about 80 percent and more preferably between about 50 and about 70 percent. A high solid to liquid ratio in the slurry is desirable for several well-known reasons. Excess solvent preferably is removed prior to further processing. Excessive solvent may produce lower density particles and higher losses of fine particles.

The slurry can be converted into a substantially dry powder by methods known to those skilled in the art. Any method which produces a substantially dry powder from the ceramic slurry can be utilized in this invention. Preferably, said conversion is accomplished by spray drying or pan drying, with or without the application of heat. Prior to converting said slurry, the slurry preferably is filtered to obtain the smallest particles.

In one preferred embodiment, the ceramic slurry is converted into a dry powder in a nitrogen atmosphere. The use of a nitrogen atmosphere can prevent oxidation of the ceramic material which typically may occur in an oxygen-containing atmosphere.

A preformed ceramic article, or ceramic preform, comprising the ceramic material and poly(ethyloxazoline) can be fabricated by any suitable means such as, for example, dry pressing, isostatic pressing, extrusion or slip casting. The ceramic preform preferably will have the desired shape of the final product and have sufficient density to substantially retain its shape during handling and further processing. The green ceramic preform possesses greater green compressive strength than ceramic preforms prepared using binders currently known in the art.

The ceramic preform can be heated to remove or burn out the poly(ethyloxazoline). It is desirable to burn out the poly(ethyloxazoline) over a range of temperatures. For poly(ethyloxazoline), burn out typically is accomplished over a temperature range between about 380° C. and about 450° C. Details as to useful time, temperature and pressure range are easily ascertained by workers in the field.

The ceramic preform can be further densified following binder removal to produce the final ceramic product.

SPECIFIC EMBODIMENTS

The following example is included for illustrative purpose only, and is not intended to limit the scope of the invention or claims. All parts and percentages are by weight unless otherwise specified.

EXAMPLE 1

A slurry containing poly(ethyloxazoline) (25 g) having a weight average molecular weight of approximately 200,000, deionized water (302 g), DARVAN® (1.5 g) and aluminum oxide (1,000 g) is mixed for 5 minutes. Then, the slurry is ball milled in a 1-gallon ball mill containing aluminum oxide balls (1-inch diameter) for 20 hours and then is screened through a 100-mesh screen to remove any oversized materials and the balls. The slurry is then air dried for 12 hours at ambient temperature. A portion of the powder is then pressed into pellets under 16,000 psi. The green compressive strength of the pellets is measured using an Instron Tester. The results are summarized in Table 1.

COMPARATIVE EXPERIMENT 1

(Not an embodiment of the invention.)

A comparative sample pellet is prepared by substantially following the procedure of Example 1 except that polyvinyl alcohol (GELVETOL® 20/30) available from Monsanto Company, is used as the binder instead of poly(ethyloxazoline). The data obtained is summarized in Table I.

TABLE I

| Binder | Percent[4] | Percent[5] Solids | Viscosity[1] (cps) | Percent Water[2] After Drying | Green[3] Density (g/cc) | Green[3] Compressive Strength (psi) ASTM D-695 |
|---|---|---|---|---|---|---|
| Poly(ethyloxazoline) | 2.5 | 70.0 | 2120 | 0.44 | 2.310 | 1320 |
| Polyvinyl alcohol | 2.5 | 70.0 | 1520 | 0.39 | 2.292 | 810 |

[1]Brookfield, #5 spindle, 50 rpm.
[2]Gravimetric, percent weight loss after heating 1.5 hours at 127° C.
[3]Triplicate samples.
[4]Percent of the ceramic/binder composition which is binder.
[5]Percent of the slurry which is solids.

What is claimed is:

1. A method comprising forming a slurry containing a ceramic material and poly(ethyloxazoline), converting said slurry into a substantially dry powder, converting the powder into a body of a desired shape, and heating the body to substantially burn out the poly(ethyloxazoline).

2. The method of claim 1 wherein the slurry additionally contains a metallic material selected from the group consisting of cobalt, nickel, iron, tungsten, molybdenum, tantalum, titanium, chromium, niobium, boron, zirconium, vanadium, silicon, palladium, hafnium, aluminum, copper, alloys thereof or mixtures thereof.

3. The method of claim 1 wherein the slurry has a solids content of between about 20 and about 80 weight percent.

4. The method of claim 1 wherein the slurry has a solids content between about 50 and about 70 weight percent.

5. The method of claim 1 wherein the slurry comprises between about 0.1 and about 20 weight percent of poly(ethyloxazoline).

6. The method of claim 1 wherein the slurry comprises between about 0.1 and 5 weight percent of poly(ethyloxazoline).

7. The method of claim 1 wherein the slurry comprises about 2.5 weight percent of poly-(ethyloxazoline).

8. The method of claim 1 wherein said slurry comprises water.

9. The method of claim 1 wherein said slurry comprises a polar organic solvent which substantially solubilizes poly(ethyloxazoline).

10. The method of claim 1 wherein the poly(ethyloxazoline) has a molecular weight in a range from about 10,000 to about 750,000.

11. The method of claim 1 wherein the poly(ethyloxazoline) has a molecular weight in a range from about 50,000 to about 500,000.

12. The method of claim 1 wherein the slurry is converted into a dry powder in a substantially nitrogen atmosphere.

13. The method of claim 1 wherein the body is heated between about 380° C. and about 500° C.

14. The method of claim 1 wherein the body is heated between about 450° C. and about 500° C.

* * * * *